United States Patent [19]
Bendelli et al.

[11] Patent Number: 5,812,291
[45] Date of Patent: Sep. 22, 1998

[54] OPTICAL ADD-DROP MULTIPLEXER FOR OPTICAL COMMUNICATION NETWORKS

[75] Inventors: Giampaolo Bendelli, Rivergaro; Roberto Lano, Almese, both of Italy

[73] Assignee: CSELT Centro Studi E Laboratori Telecomunicazioni S.P.A., Turin, Italy

[21] Appl. No.: 603,862

[22] Filed: Feb. 22, 1996

[30] Foreign Application Priority Data

Mar. 22, 1995 [IT] Italy ................................. TO95A0215
May 5, 1995 [IT] Italy ................................. TO95A0357

[51] Int. Cl.⁶ ..................................................... H04S 14/02
[52] U.S. Cl. ............................................ 359/129; 359/127
[58] Field of Search ................................. 359/127, 129, 359/130, 131, 125; 385/4, 14, 15, 24, 10

[56] References Cited

U.S. PATENT DOCUMENTS

| | | | |
|---|---|---|---|
| 4,244,045 | 1/1981 | Nosu et al. | 359/129 |
| 4,482,994 | 11/1984 | Ishikawa | 359/129 |
| 4,673,270 | 6/1987 | Gordon . | |
| 4,707,064 | 11/1987 | Dobrowolski et al. | 359/129 |
| 5,005,935 | 4/1991 | Kunikane et al. . | |
| 5,583,683 | 12/1996 | Scobey | 359/129 |
| 5,629,995 | 5/1997 | Duck et al. | 359/131 |

FOREIGN PATENT DOCUMENTS

| | | |
|---|---|---|
| 0 153 722 | 2/1985 | European Pat. Off. . |
| 0 234 369 A1 | 9/1987 | European Pat. Off. . |
| 0 562 953 A1 | 9/1993 | France . |

OTHER PUBLICATIONS

Arrayed–waveguide grating add–drop multiplexer with loop–back optical paths Electronics Letters—25th Nov. 1993, vol. 29, No. 24.

OFC'95 Optical Fiber Communcation, vol. 8, 1995 Technical Digest Series, 26 Feb–3 Mar 95 Multilayer Add–Drop Multiplexers in a Self–Healing WDM Ring Network, Laville, et al.

*Primary Examiner*—Rafael Bacares
*Attorney, Agent, or Firm*—Herbert Dubno

[57] ABSTRACT

The optical add/drop multiplexer has a pair of nominally identical interference filters, one of which carries out the function of extracting a carrier from a wavelength division multiplexed stream and the other the insertion function. The filters are arranged in parallel planes and are secured to opposite faces of a transparent plate so that the stream exits the device after having undergone reflection by both filters. The plate is mounted on a support which can be rotated in either direction to vary the tuning wavelength of the filters.

3 Claims, 2 Drawing Sheets

OPTICAL ADD-DROP MULTIPLEXER FOR OPTICAL COMMUNICATION NETWORKS

SPECIFICATION

FIELD OF THE INVENTION

Our present invention relates to optical communication networks and, more particularly to an optical add-drop multiplexer, i.e. a device for the extraction of a carrier, modulated by a certain information signal, from a stream of optical signals comprising multiple carriers, and for the insertion of the information into the stream of another carrier, modulated by a different information signal.

BACKGROUND OF THE INVENTION

Add-drop multiplexers are used, for instance, in nodes of a wavelength division multiplexing communication network, to extract from the multiplexed stream a channel containing the information directed to a user or to users connected to the node, letting the remaining channels pass through unaltered, and to add to the multiplexed stream a new channel which transports the information generated within the node. In practice, to simplify network management, it is advantageous that the dropped channel and the added channel are allocated the same wavelength position, which is therefore unambiguously associated with the node itself. Another possible application of such devices is in routing nodes of reconfigurable optical networks, to re-route certain information streams as a result of changed traffic conditions or to remedy a failure downstream of the node.

Add-drop multiplexers can be considered four-port devices, with two ports for the input/output of the overall stream and two ports for the input/output of the individual carrier. Hereinafter the ports related to the overall stream shall respectively be called the input port of the output port, and those related to the individual carrier shall be called the "drop" and respectively the "add" (or insertion) port.

To manufacture add-drop multiplexers, the use of non-absorbing interference filters has been proposed. These filters, as is well known, comprise a succession of dielectric layers having such refraction indices and thicknesses that the filters transmit a certain portion of the spectrum of the incident radiation and reflect the remaining portion. A simple inclined interference filter, placed in a suitable system for collimating and re-focusing the optical beams, in principle could directly perform the functions required of the device. The filter receives on one face the multiplexed stream and reflects all wavelengths except the one to be extracted, which exits from the opposite face. This face receives the wavelength to be re-inserted, which in turn is transmitted through the filter and is combined with the multiplexed stream. However, a device using a single filter has a poor extinction ratio in reflection. Thus a non-negligible fraction of the power associated with the extracted channel is transferred to the output port, thereby creating interference phenomena between this signal and the one at the same wavelength that is present at the add port, and these phenomena lead to severe degradation in the performance of the system. Moreover filter tuning is hard to achieve, since the variation of the filter inclination required to vary the transmitted band also causes the angular displacement of the reflected beam with respect to an optical collecting system.

The paper "Multilayer add-drop multiplexers in a self healing WDM ring network", presented by A. Hamel et al. at the OFC '95 Conference, San Diego (USA), 26 Feb.–3 Mar. 1995, paper TuQ2, describes a device utilizing two interference filters, one to drop and the other to add a channel. This device has a good extinction ratio, according to the data reported in the paper. However, the actual structure of the device is not described, nor is the possibility of filter tuning mentioned.

OBJECT OF THE INVENTION

The object of the present invention is to provide an add-drop multiplexer which has a good extinction ratio in reflection and is tunable.

SUMMARY OF THE INVENTION

The add-drop multiplexer according to the invention comprises a pair of nominally identical interference filters, one of which carries out the drop function and the other the add function. The two filters are arranged in parallel planes and are secured to opposite faces of a transparent body, so that the stream including the plurality of carriers leaves the device after having undergone reflection by both filters. The body is in turn mounted on a support which is hinged on an axis passing through the barycenter of the multiplexer and parallel to the plane of the filters, and which is associated with means which cause its rotation in either direction to vary the tuning wavelength of the filters.

EP-A 0 153 722 in the name of Oki Electric Industry Company, Limited, published on 4 Sep. 1985, describes a device for multiplexing and demultiplexing multiple wavelengths (or for transmitting and receiving multiple wavelengths) which, in case of operation on two wavelengths, has two parallel interference filters applied to two opposite faces of a transparent support. However, the filters are tuned on different wavelengths, so the device cannot be used to extract and re-insert given carrier. The extraction of a carrier from a transiting stream and the re-insertion into the stream of the same carrier are also made impossible by the fact that the device incorporates the generators and detectors for all carriers to be multiplexed or demultiplexed. Finally, this device too is not tunable.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
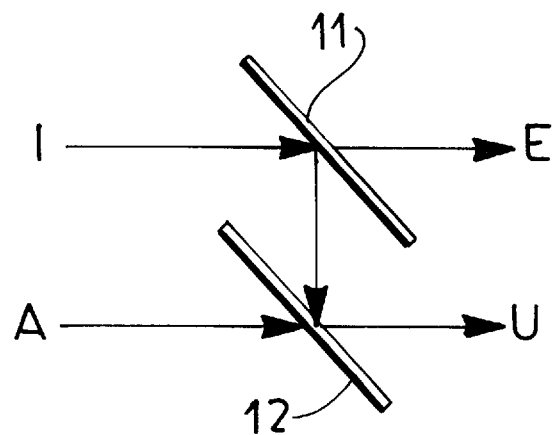
FIG. 1 is a schematic diagram of the device according to the invention.

As can be seen in FIG. 1, the device comprises two nominally identical interference filters 11, 12, i.e. filters having the same spectral responses in reflection and transmission. The filters are parallel to each other and rigidly rotatable together around the overall barycentre of the device. The wavelength division multiplexed stream present on the input port (I) reaches a face of filter 11, which transmits towards the drop port (E) one of the channels (whose wavelength depends on the inclination of the filter). The other channels are reflected towards filter 12 from which they are reflected again, thus passing to the output port (U). Filter 12 receives on the opposite face the channel to be re-inserted (add port A) which is transmitted and introduced into the multiplexed stream present on the output port. Owing to the way the ports are arranged, it can be noted that the stream passes to the output port after having undergone reflection by both filters. Filter 12 too, being nominally identical to filter 11, will transmit a substantial fraction of the residual power associated to the extracted channel. In this way the extinction ratio in reflection is doubled (in dB) with respect to a structure utilizing a single filter which, as stated above, could carry out the functions of an add-drop multiplexer. Moreover, the rigid rotation of the two filters allows tuning of their spectral responses, while maintaining the parallelism between the beams present on the drop and output ports. Thus such beams can still be easily focused onto respective fibers.

Figure 2:
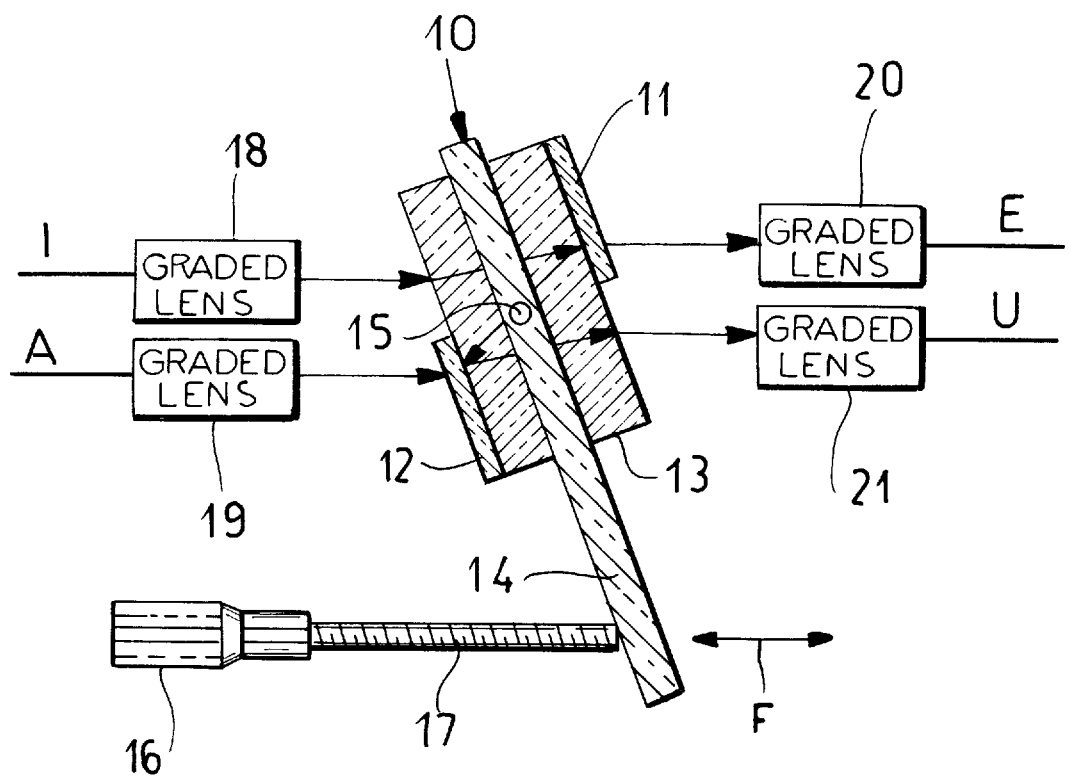
FIGS. 2 and 3 are top views of two embodiments of the device.

FIG. 2 is a more detailed depiction of a preferred embodiment of the device, indicated as a whole as 10. The elements described with reference to FIG. 1 are indicated with the same references characters. Ports I, A, E, U are made of optical fibers terminating at the device. As can be seen, filters 11, 12 are borne by a plate 13 of transparent material. Such an arrangement can be obtained by direct deposition of the dielectric layers or by gluing with adhesives having a suitable refraction index. The assembly constituted by plate 13 and filters 11, 12 is mounted on a support 14 hinged on a vertical axis 15 passing through the barycenter, and can rotate in both directions, as indicated by arrow F. The rotation of support 14 can be actuated by a micrometer screw device 16 through a lever 17.

The beams present at ports I, A are conveyed towards device 10 by respective graded index lenses 18, 19, and the beams leaving device 10 and directed to ports E, U are collected by respective graded index lenses 20, 21. Device 10 with the rotation control means and lenses 18–21 are mounted on a common support, which is not shown.

The inclination angle of plate 13 with respect to the axes of lenses 18–21 in a position corresponding essentially to the central tuning value of the filter must take into account two contrasting requirements. On the one hand a pronounced inclination improves filter tuning and increases the spatial separation between the beams directed to ports E, U, as is required to allow the beams to be coupled in the respective focusing lenses 20, 21 (whose diameters are typically of the order of 3 mm). On the other hand, the device is somewhat dependent on polarization and the dependence increases as the angle of incidence of the beam increases. More particularly, in the case of a polarization component perpendicular to the incidence plane, the reflected band is much narrower than in the case of the parallel component and, since the state of polarisation of the stream arriving at the device cannot be guaranteed a priori, this can represent a limitation to the performance of the device. It has been found that an inclination angle of about 25° represents a good compromise between the various requirements.

As regards the extent of rotation of device 10, and thus the amplitude of the filter tuning interval, it is necessary to consider the typical tolerances of graded index lenses with respect to parallel translations of an input beam. It has been found that, with the mean inclination angle stated above, rotations of about ±3 degrees, corresponding to a tuning interval of over 10 nanometers, can be suitable.

Figure 3:
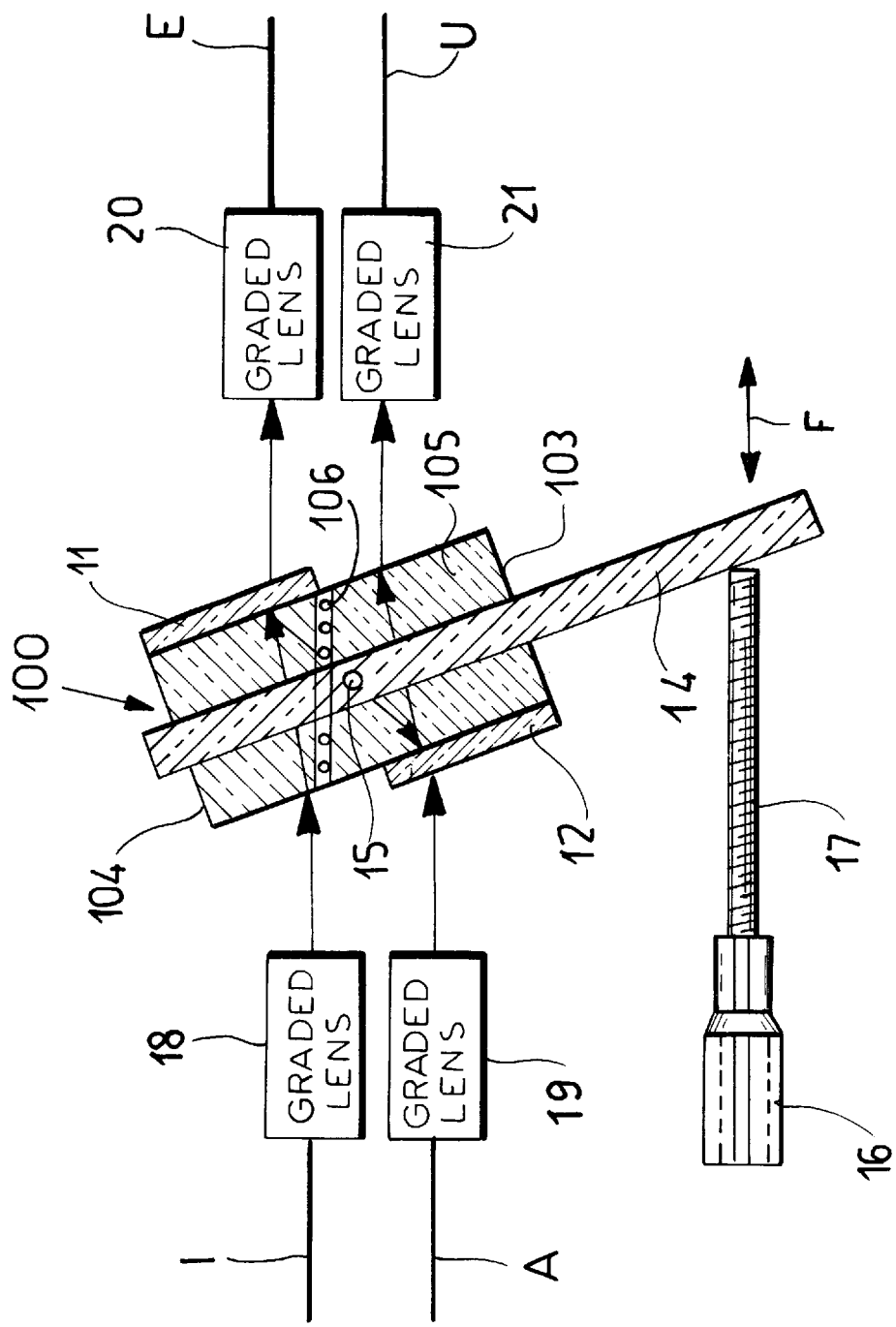

To reduce dependence on the polarization of the signals of the incident stream, device 100 shown in FIG. 3 can be used. In FIG. 3, the elements identical to those shown in FIG. 2 are denoted by the same reference numerals.

In this embodiment, interference filters 11, 12 are secured to opposite faces of a body 103 made of transparent material and comprising a pair of blocks 104, 105 each of which carries a respective filter 11, 12. The two blocks are joined together by means of a half-wave plate 106 which has bi-refringence axes at 45° with respect to the incidence plane of the radiation. The wavelength division stream present on input port I, which is randomly polarized, with a certain ratio between the components parallel and perpendicular to the incidence plane of the stream itself, arrives on a face of filter 11, which as before transmits towards extraction port E one of the channels (whose wavelength depends on the inclination angle of the filter) and reflects the other channels towards filter 12. In the path between the two filters 11 and 12, the reflected stream crosses plate 106 which rotates the polarization plane of the stream by 90°, so that in the stream impinging on filter 12 the two polarization components are mutually exchanged with respect to the stream impinging on filter 11. In this way, the different responses of the filters to the polarization parallel and orthogonal to the incidence plane are compensated. Since the presence of half-wave plate 106 reduces the dependence of the device on polarization, the stream can be sent onto the device with higher angles of incidence.

In respect of the channel dropped through filter 11 and the one added through filter 12, it should be remembered that the diversity in the filter response to the two polarization states is less noticeable in transmission; moreover, only one carrier is involved and therefore bandwidth problems are not critical.

It is evident that what is described herein is given solely by way of non-limiting example and that variations and modifications are possible without departing from the scope of the invention.

We claim:

1. An add-drop multiplexer device for the extraction of at least one optical carrier, modulated by an information signal, from a stream of optical signals comprising a plurality of carriers with different wavelengths, and for the reinsertion into the stream of the same carrier modulated by a different information signal, the device comprising a pair of nominally identical interference filters, one of which performs the extraction function and the other the insertion function, the two filters being arranged in parallel planes and are secured to opposite faces of a transparent body in such a way that said stream exits the multiplexer after having undergone reflection by both filters, and in that said transparent body is mounted on a support which is hinged on an axis passing through the barycenter of the multiplexer and parallel to the planes of the filters, and is associated to means which cause its rotation in either direction to vary the tuning wavelength of the filters.

2. The add-drop multiplexer device according to claim 1 wherein said transparent body comprises a transparent plate carrying both filters.

3. The add-drop multiplexer device according to claim 1 wherein said transparent body comprises a pair of elements each bearing a respective filter and joined together by means of a half-wave plate which presents bi-refringence axes at 45° with respect to the incidence plane on the device of the stream comprising the plurality of carriers and which is crossed by said stream in its path between the two filters.

* * * * *